June 23, 1936.  P. P. CIOFFI  2,045,438
CONTROL APPARATUS
Filed Dec. 19, 1934   2 Sheets-Sheet 2

INVENTOR
P. P. CIOFFI
BY *J. MacDonald*
ATTORNEY

Patented June 23, 1936

2,045,438

UNITED STATES PATENT OFFICE

2,045,438

CONTROL APPARATUS

Paul P. Cioffi, Brooklyn, N. Y., assignor to Bell Telephone Laboratories, Incorporated, New York, N. Y., a corporation of New York Application December 19, 1934, Serial No. 758,170

10 Claims. (Cl. 236—46)

This invention relates to apparatus for the automatic control of furnace heating or cooling rates. In many cases during heat treatment of metal it is desired to have control of the heating or cooling rates.

The object of this invention is to provide an improved and simple arrangement for producing a progressive change of temperature, with time, according to a predetermined program.

Temperature recorders which plot temperature changes, with time, are often modified to include means for controlling the temperature of a furnace. It is common practice to have the means for controlling the temperature comprise a pair of contacts actuated by the mechanism which records the temperature and to have the contacts control the supply of current to a heating coil in the furnace. When the contacts are closed the furnace absorbs more power. When the contacts are open the power to the furnace is diminished or discontinued. If the temperature of the furnace falls below a set value, the contacts are automatically closed and the furnace absorbs more power. A rise in temperature above another set value causes opening of the contacts. Thus, the temperature is held between narrow limits over any required period of time.

In accordance with this invention, the temperature setting for the make-and-break of the contacts is made to change with time to correspond to a desired heating or cooling curve whereby the rate of heating or cooling of the furnace is controlled.

More specifically, the temperature recorder, which may be of the well-known Leeds and Northrup type, is provided with an auxiliary paper drive drum preferably located in front of the main paper drive drum and driven by the same worm. This auxiliary drum drives a program sheet comprising a length of recorder paper on which is pasted a strip of foil, one edge of which corresponds to a predetermined heating or cooling rate. Electric contact is made with this edge of the foil by a metal stylus pressing lightly on the program sheet. The stylus and metal foil are connected by flexible leads to one end of a double-pole-double-throw switch, while the usual control contacts for constant temperature are connected to the other end of the switch. Midpoints of the switch are connected to a power or heat control relay. When the furnace temperature is to be maintained constant the machine operates in the regular way, the switch being thrown to connect the usual control contacts in circuit with the power control relay. When heating or cooling is to be at a controlled rate a paper with that heating or cooling curve upon it is adjusted on the auxiliary drum at the proper place. The switch is thrown to connect the stylus and foil in circuit with the power control relay. The temperature of the furnace is then controlled by the stylus and the foil on the control sheet and as the foil is always moving linearly with time, the temperature at which the shift between power limits takes place thus varies with time. The result is that the temperature of the furnace changes in accordance with the predetermined heating or cooling rate, the rate being determined by the location and form of the edge of the metal foil.

Instead of securing a strip of metal foil on the control sheet, the same result would be secured by providing an elongated aperture in the paper whereupon the stylus would make electrical contact with the auxiliary drum along the edge of the aperture in the paper.

Figure 1:
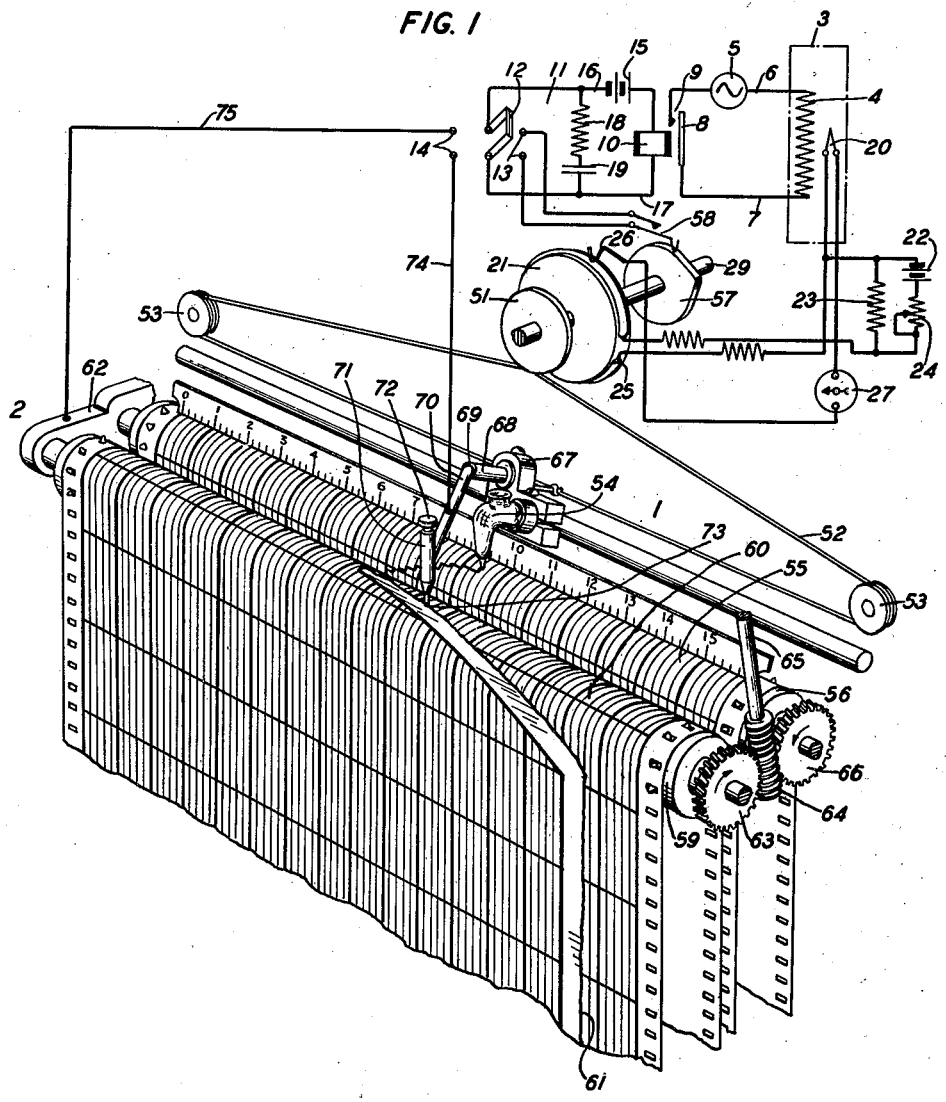
Fig. 1 is a view in perspective of the apparatus for controlling the supply of current to a heating element, in accordance with a predetermined program, combined with apparatus for graphically recording temperature. This figure also includes a schematic showing how the control apparatus and the recording apparatus may be associated with a heating element.

As stated in connection with the heat treatment of metal or other substances, it becomes necessary in some instances in order to obtain articles having required characteristics, to not only bring the article treated to a required temperature, but to bring the article to the required temperature within the space of a certain predetermined period of time. In some cases it also becomes necessary in order to obtain articles having required characteristics to control the rate of cooling the article after it has been brought to a required temperature.

In the heat treatment of articles in electric furnaces, it has been the practice to manually connect the source of current supply to a heating element in the furnace at the beginning of the heat treatment and to thereafter manually control the supply of current to the heating element in accordance with a predetermined program. This requires constant supervision of the operation of the furnace and the result obtained depends on the faithfulness of an attendant in manually controlling the operation of the furnace. If the supply of current to the heating element in the furnace is not manually controlled by the attendant exactly in accordance with a predetermined program, the article treated will not have the required characteristic. For instance, in the heat treatment of a piece of magnetic material, it may be necessary in order to obtain a piece of material having the required characteristic, to bring the temperature of the furnace in which the article is being treated up to a predetermined level within a certain predetermined period of time, to hold the furnace at that temperature for a certain length of time and then have the furnace cool off down to room temperature within a certain predetermined period of time.

With this invention the human element may be eliminated from the control of the furnace from the time in which an article is placed in a furnace and the current is turned on until the heat treatment is finished, or during any part or parts of the heat treating program. The heating or cooling rates or both the heating and the cooling rates of the furnace may be automatically controlled in accordance with a predetermined program. Graphic records made in experimental heat treatments may be utilized as patterns for control sheets for controlling the supply of current to a heating element in a furnace.

Although it is not essential to this invention, the control apparatus may be used in connection with a modified well-known type of temperature recorder. To illustrate the invention and to show one way in which it may be used, the invention is shown in the drawings and is described in this specification as being applied to a temperature recorder of the Leeds and Northrup type.

Referring to the drawings in which like reference characters designate the same parts in the several views, 1 is the temperature recording apparatus and 2 is the control apparatus. The temperature recording apparatus 1 is adapted to make a graphic record of the temperature of a furnace 3 which is shown in the schematic portion of Fig. 1. The furnace 3 includes a heating coil 4 which is supplied with current from a suitable source such, for instance, as the alternating current generator 5 over the conductors 6 and 7. A circuit including the source of alternating current 5 and the heating coil 4 includes an armature 8 and a front contact 9 of an electromagnetic device 10. The electromagnetic device 10 is in a circuit 11 which may be brought under the control of either the temperature recording apparatus 1 or the temperature control apparatus 2 by manual operation of a double-pole-double-throw switch 12. When the switch 12 is thrown to the right and engages the poles 13, the circuit 11 is brought under the control of the temperature recording apparatus 1. When the switch 12 is thrown to the left and engages the poles 14, the circuit 11 is brought under the control of the temperature control apparatus 2. The circuit 11 includes a source of current supply such, for instance, as the battery 15, conductors 16 and 17, electromagnetic device 10 and the central poles of the switch 12. In shunt across the conductors 16 and 17 are a resistance 18 and a condenser 19 connected in series.

Figure 2:
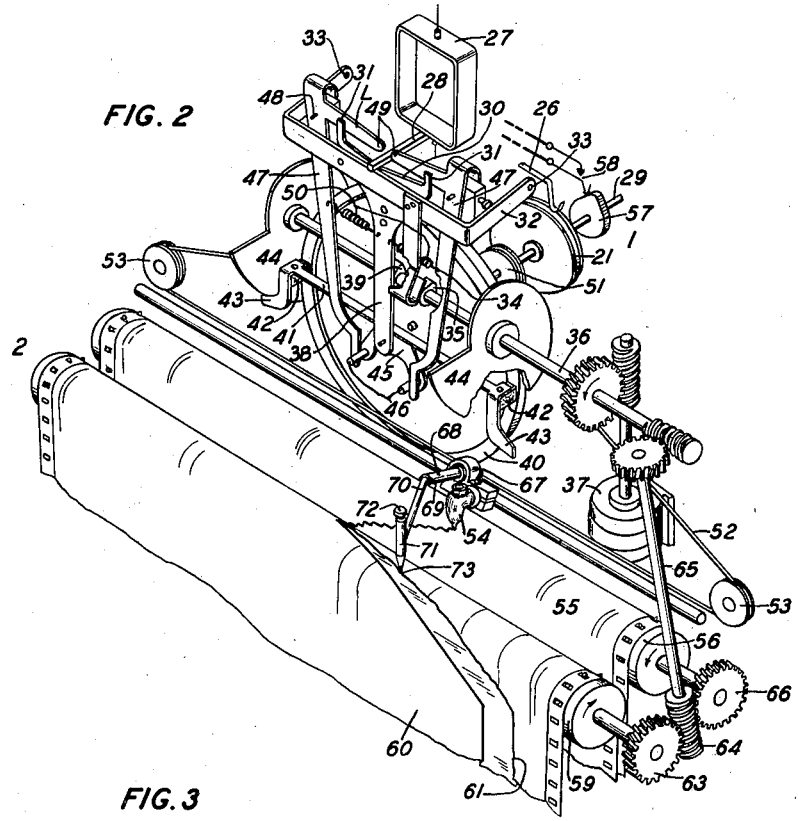
Fig. 2 is a view in perspective of the control apparatus and the temperature recording apparatus shown in Fig. 1 and including some of the mechanical structure of the temperature recorder.

The temperature of the furnace 3 is measured in the usual manner by a thermocouple 20, the electromotive force of which is adapted to be balanced against the potential difference across the portion of a resistance element 21. The potential difference across the resistance element 21 is maintained constant by a potentiometer circuit comprising a battery 22, a fixed resistance 23 and a variable resistance 24 which is provided for the purpose of adjusting for the variations of the electromotive force of the battery 22. When the electromotive force of the thermocouple 20 is equal to the potential difference across the resistance element 21 between the point 25 and the sliding contact 26, no current will flow in a galvanometer 27 which is included in the thermocouple circuit. Whenever there is a difference between the electromotive force of the thermocouple 20 and the potential difference across the resistance element 21 between the point 25 and the sliding contact 26, a current will flow through the galvanometer 27 and deflect a needle 28 attached thereto, as shown in Fig. 2, either to the right or to the left, depending upon whether the electromotive force is greater or less than the potential difference across the portion of the resistance element 21 between the point 25 and the sliding contact 26. The deflection of the galvanometer needle 28 causes a rotation of the shaft 29 and adjustment of the resistance element 21 relative to the sliding contact 26 until the balance is again established.

The mechanism for causing the adjustment of the resistance element 21 in accordance with the deflection of the galvanometer needle 28 is illustrated in detail in Fig. 2 in which the needle 28 is shown resting upon a ledge 30 which rises from the center toward each end and terminates in a pair of projections 31 which prevent deflection of the needle 28 beyond ends of the ledge 30. The ledge 30 is fixed to a U-shaped yoke 32 pivoted at 33—33. The yoke 32 carries a downwardly extending arm 34, the lower end of which is bent outward and then inward and upwardly to form a U-shaped end which is engaged by a cam 35 mounted on a shaft 36 which is continuously rotated by a motor 37 causing a rising and falling of the yoke 32 and the ledge 30 and imparting a similar movement to the end of the needle 28 which rests on the ledge 30. A resilient arm 38 attached at its upper portion to a support, not shown, extends downwardly from a point directly below the center of the yoke 32 and below the ledge 30. The arm 38 is engaged by a second cam 39 on the shaft 36 which tends to move continuously the arm 38 toward and away from a disc 40. To the lower end of the arm 38 is pivotally attached a cross-arm 41 which carries at its extremities a pair of shoes 42 adapted to frictionally engage the disc 40 when the arm 38 is moved toward the disc. The cross-arm 41 terminates in a pair of projections 43 located in such a position that a pair of rotating cams 44 will not normally strike them. A plate 45 having downwardly diverging arms is fixed to the cross-arm 41 and carries a pair of pins 46 which project normal to the plane of the plate 45 and which are engaged by spaced and downwardly projecting arms 47. The arms 47 are pivoted at 48 and are provided with upper and inwardly directed projections 49 which project over the ledge 30. The arms 47 have their lower ends held in engagement with the pins 46 by means of springs 50.

When the galvanometer needle 28 is deflected it will tend to pass under one of the projections 49 and upon the rising of the yoke 32, the projections 49 will be raised moving the arm 47 and causing it to displace the plate 45 and pivot the cross-arm 41 about its center. At this time the cam 39 will act to allow the shoes 42 to frictionally engaged the disc 40 and as the cam 44 is rotated, it will engage a projection 43 and return the cross-arm 41 to normal horizontal position. The shoes 42 will grip the disc 40 and rotate the disc thereby rotating the shaft 29, to adjust the resistance element 21 to such a value as to cause the galvanometer needle 28 to return to its central position indicating that the voltage of the thermocouple is equal to the potential difference across the portion of the resistance element 21 between the point 25 and the sliding contact 26.

Secured upon the shaft 29 is also a grooved pulley 51 around which, as shown in Fig. 1, passes a cord 52 which passes over suitable pulleys 53 and is secured to a carriage 67 carrying a marker pen 54 movable transversely with respect to the recorder paper 55 which passes over and is driven by a drum 56. The drum 56 is continuously rotated through suitable worm gearing by means of the motor 37. The marker pen 54 makes a continuous line on the recorder paper 55 and is moved transversely, whenever the shaft 29 is rotated, due to deflections of the galvanometer needle 28 and the adjusting movements of the resistance element 21.

Attached to the shaft 29 is a cam 57 which operates a pair of contacts 58. The contacts 58 are wired to the right-hand poles of the switch 12. When the switch 12 is thrown to the right and engages the right-hand poles 13, the current supplied to the heating coil 4 in the furnace 3 is under the control of the recording apparatus 1. When the shaft 29 is rotated, it causes the cam 57 to close the contacts 58, the electromagnetic device 10 is energized and pulls its armature 8 against front contact 9. This closes a circuit to the heating coil 4 and heat is applied to the furnace 3. When the thermocoupie 20 in the furnace becomes sufficiently affected by the increase in temperature in the furnace as to cause unbalance in the circuit including the resistance element 21 and the shaft 29 is rotated, the cam 57 operates to release the contacts 58. The electromagnetic device 10 is then deenergized and releases its armature 8 from contact with front contact 9. The current supply circuit for the heating coil 4 is then opened and remains open until the temperature of the furnace drops to a sufficiently low level to affect the thermocouple 20 to cause an unbalance in the circuit again. In this instance the galvanometer needle 28 is deflected to a point opposite to that which it assumes for high temperatures. The shaft 29 is rotated in the direction opposite to its previous movement and the cam 57 closes the contacts 58. The electromagnetic device 10 is then again energized and current is supplied to the heating coil 4.

From the foregoing description it is obvious that with the switch 12 thrown to the right and the current supply to the heating coil 4 under the control of the recorder apparatus 1, a constant predetermined temperature within certain allowed limits will be maintained in the furnace 3. With this apparatus controlling the furnace, however, the heating and cooling rates of the furnace cannot be readily and accurately varied and controlled in accordance with a predetermined program.

Means by which the heating and cooling rates of the furnace may be readily and accurately controlled in accordance with a predetermined program are provided in the control apparatus 2. In the control apparatus 2 a driven metal drum 59 carries a control sheet 60 of paper or other non-conducting material in which a line 61 is provided. The line 61 represents a heating or cooling rate program for the furnace 3, the length and the form of the line 61 having been predetermined by experimental tests or by calculation. The line 61 may be a slit in the control sheet 60 or a strip of conducting material incorporated therein. A convenient way of providing the line 61 in the control sheet 60 is to draw a line of the required length and form on the control sheet 60, then cut through the control sheet 60 along the line marked thereon. The slit cut through the control sheet 60 may then be widened by cutting away more of the paper along a line substantially parallel to the line 61, but not changing the length or the form of the slit first cut in the paper since this first cut contains an edge which is the control line required for the heating or the cooling rate program. The drum 59 is rotatably supported in a frame 62 which may be part of the recorder frame and carries at one end a worm wheel 63. The worm wheel 63 is driven by a worm 64 connected to a shaft 65 and driven through a suitable system of gears by the motor 37. The shaft 65 which is part of the drum drive mechanism in the recorder 1 may be utilized as shown in the drawings, to drive both the recorder drum 56 and the drum 59 of the control apparatus 2, the worm 64 on the shaft 65 being placed between a worm wheel 66 on the recorder and the worm wheel 63 of the control apparatus 2.

Supported on the carriage 67 carrying the recorder pen 54 is an arm 68 which is connected by means of a universal connection 69 to a stylus arm 70. The stylus arm 70 carries at its free end a stylus holder 71 carrying an adjusting screw 72 and an adjustable stylus contact 73 which is adapted to bear against the control sheet 60 or project through the slit in the control sheet 60 according to the position taken. The lower extremity of the adjustable stylus 73 is rounded so that it will readily slide over the edge of the slit cut along the line 61 when the carriage 67 is moved transversely by means of the cord 52 and the grooved pulley 51. The stylus arm 70 is connected by a conductor 74 to the lower left-hand pole 14 of the switch 12. The upper left-hand pole 14 of the switch 12 is connected by conductor 75 to the frame 62.

When the switch 12 is thrown to the left and engages the poles 14, the current supply for the heating coil 4 of the furnace 3 is controlled through the stylus 73 and the drum 59 or the conducting strip on the control sheet 60 of the control apparatus 2. When the stylus projects through the slit in the control sheet 60 and engages the drum 59, the electromagnetic device 10 is energized and closes its armature 8 against front contact 9 to complete the circuit of current supply to the heating coil 4. When the paper of the control sheet 60 comes between the stylus 73 and the drum 59, the circuit to the electromagnetic device 10 is opened. The electromagnetic device 10 releases and the circuit to the heating coil 4 is opened by release of armature 8 from engagement with front contact 9.

With the arrangement shown in Figs. 1 and 2, the drum 59 of the control apparatus 2 is driven in a clockwise direction and the drum 56 of the recording apparatus 1 is driven in a counter-clockwise direction. The record of the gradually rising temperature of the furnace 3 on the record sheet 55, therefore, will slope upward toward the right on the record sheet 55. The program curve on the control sheet 60 will slope downward toward the right of the control sheet 60. As the roller 59 moves the control sheet 60 under the stylus 73, it brings the slit in the paper of the control sheet 60 under the stylus 73. The stylus 73 then makes contact with the metal drum 59. This results in energization of the electromagnetic device 10 and connection of the supply of current to the heating coil 4 of the furnace 3. The furnace 3, therefore, begins to heat. The thermocouple 20 then becomes affected and unbalance occurs in the thermocouple circuit. The galvanometer needle 28 is then deflected. The rising yoke 32 by means of the ledge 30 moves the needle 28 upward against one of the projections 49 and causes the corresponding arm 47 pressing against the pin 46 to swing the plate 45 and the cross-arm 41 about the common pivot point of the plate 45 and the cross-arm 41. This will bring a projection 43 into the path of movement of a cam 44 which is continuously rotating. The cam 39 on the continuously rotating shaft 36 is positioned so that it releases the resilient arm 38 when the enlarged portions of the cams 44 are down and permits the shoes 42 to frictionally engage the disc 40. One of the cams 44, therefore, will press against a projection 43 and restore the cross-arm 41 to normal horizontal position. The disc 40 will be rotated by means of a shoe 42 and will rotate the shaft 29 to adjust the resistance element 21. Rotation of the shaft 29 will cause rotation of the grooved pulley 51, movement of the cord 52 and transverse movement of the carriage 67. The recorder pen 54, therefore, will be moved transversely to the right on the recorder paper 55 and the stylus 73 will be moved transversely to the right of the control paper 60 until it passes over the right-hand edge of the slit in the control sheet 60 and on to the paper of the control sheet. The electromagnetic device 10 will then be deenergized and will open the circuit to the heating coil 4 of the furnace 3. The furnace 3 then begins to cool. As the furnace cools the thermocouple 20 becomes affected, rotation of the shaft 29 takes place and the stylus 73 is moved back again to the left to project through the slit in the control sheet 60 and make contact with the drum 59. Since the drum 59 of the control apparatus 2 is continuously rotated and carries the control sheet 60 relative to the stylus 73, new portions of the program curve are continually being presented to the stylus 73. The paper portion of the control sheet 60 along the program curve successively moves under the stylus 73. The thermocouple 20 and the galvanometer 27 in conjunction with the recorder apparatus successively operate to restore the balance of the circuit including the resistance element 21 and in doing so cause movement of the stylus 73 back to the slit in the control sheet 60 to engage the drum 59 to cause energization of the electromagnetic device 10 and closing of the circuit to the heating coil 4.

The program line 61 on the control sheet 60 may be made to have any slope and shape required for a required heat treatment program. The control sheet 60 may include a program line for controlling heating of the furnace, cooling of the furnace, maintenance of a required temperature, or any part or parts of the programs above mentioned and required. For instance, in Fig. 3 the control sheet 60 includes a program in which the furnace would be gradually brought to a required comparatively high temperature in a predetermined period of time, then maintained at the comparatively high temperature for a predetermined period and then gradually cooled to normal or room temperature in a predetermined period of time. At the top of the control sheet 60 the program line 61 slopes downward toward the right and terminates in a comparatively straight portion which extends downward along the control sheet and into a portion which slopes downward and toward the left of the control sheet. The upper portion of the program line 61 is a program for gradually heating the furnace, the comparatively straight downwardly extending portion is the program for maintenance at the required temperature for a predetermined period of time and the lower portion of the program line 61 which slopes toward the left of the control sheet 60 is a program for gradually reducing the temperature of the furnace.

Figure 3:
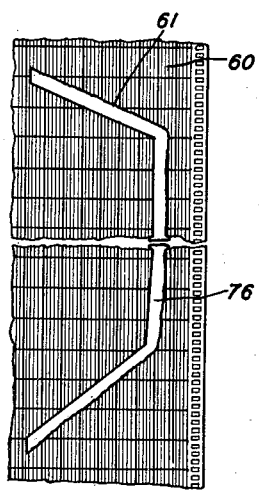
Fig. 3 is a top plan view of a portion of a control sheet for the control apparatus.

The slit in the control sheet 60 may be filled with a conducting strip to provide a contact strip between the stylus 73 and the drum 59 and to prevent displacement of the side edges of the slit by the stylus 73. In Fig. 3 a conducting strip 76 which may, for instance, be a metal foil, is pasted to the under-surface of the control sheet 60. The conducting strip 76 is wider than the slit in the control sheet and follows the general shape of the slit in the control sheet. The conducting strip 76, however, could be simply a rectangular sheet of conducting material of the same length and width as the control sheet 60 and secured to the under-surface of the control sheet or could be of any size and form sufficient to cover the portions of the control sheet 60 traversed by the program line.

Figure 4:
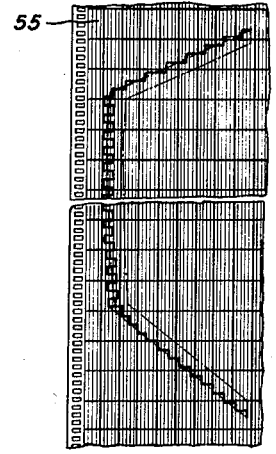
Fig. 4 is a view of a record sheet made by a recorder when the control sheet is used having the program shown in Fig. 3, the record sheet being superimposed on the control sheet shown in Fig. 3.

A heat treatment record made by the recorder apparatus 1 when the control apparatus 2 is employed and when a heat treatment control sheet 60 such as shown in Fig. 3 is used, is shown in Fig. 4. To clearly associate the heat treatment program with the record made of the heat treatment, the control sheet 60 is shown in phantom as it would appear if placed beneath the record sheet 55. Where the record lines cross into the slit in the control sheet 60, current is supplied to the heating coil of the furnace. Where the record lines pass over on to the paper adjacent the slit, no current is supplied to the heating coil.

While this invention has been described and referred to as apparatus for controlling the temperature of a furnace, it is also applicable to the control of other conditions such, for instance, as chemical, physical or electrical, the magnitude of the conditions being controlled by the apparatus in accordance with a predetermined program. The control apparatus may be made to operate to change the application of current, heat, chemical, or some other agent or reagent whenever there is a deviation from a predetermined condition with time.

Since the essential elements of the apparatus of my invention consist of a program sheet which controls the apparatus in accordance with a predetermined program, the sheet containing a metallic surface in the form of a curve which represents the changes required with time and the sheet affects the stylus or contact member bearing on the sheet, the stylus and metal portions of the sheet being in a circuit which includes means to affect the apparatus which controls the condition, therefore, by replacing a control sheet containing one program by a control sheet containing another program, any desired condition may be produced, changed and controlled.

What is claimed is:

1. In a current control for an electrical element, a control sheet having formed therein an elongated aperture of a predetermined form and edge portions of said control sheet along said aperture being curved in accordance with a current supply program for said element.

2. A current control for an electrical element comprising, in combination a pair of contacts and a control sheet operating between the contacts, said control sheet having formed therein an elongated aperture of a predetermined form and an edge portion of said control sheet along said aperture curved in accordance with a current supply program for said element.

3. A current control for an electrical element comprising, in combination a driven contact, a reciprocating contact, means to drive the driven contact, means to move said reciprocating contact, a control sheet operating between said contacts, said control sheet having provided therein an elongated aperture of a predetermined form to permit said reciprocating contact to engage said driven contact, said control sheet being driven by said driven contact and an edge portion of said control sheet along said aperture formed in accordance with a current supply program for said electrical element.

4. A current control for an electrical element, comprising, in combination, a driven conducting drum, means to drive said drum, a metal stylus, a sheet of insulating material driven by said drum between said drum and said metal stylus, said sheet of insulating material having formed therein an elongated aperture of a predetermined form and one edge of said control sheet along said aperture containing a series of curves representing a current supply program for the electrical element.

5. In a current control for an electrical element, a control sheet of insulating material having formed therein an elongated aperture, a strip of conducting material adjacent said control sheet and bridging all portions of the aperture therein and an edge portion of said control sheet along said aperture comprising a predetermined system of curves.

6. A current control for an electrical element comprising a pair of contacts, a control sheet of insulating material operating between said contacts, an elongated aperture formed in said control sheet, a conducting strip adhesively secured to said control sheet and bridging all portions of the aperture therein and an edge portion of said control sheet adjacent said aperture comprising a predetermined system of curves extending slightly above the plane of said conducting strip.

7. In a control for a heating element, a source of current for the heating element, a pair of contacts, a circuit including said heating element and said contacts, and an insulating control sheet operating between said contacts, said control sheet having formed therein an elongated aperture in the form of a curve representing the rate at which current is to be supplied to said heating element.

8. In a temperature control apparatus, a continuously driven drum, a temperature control program sheet driven by said drum, a stylus bearing on the program sheet, a carriage for said stylus, a movable structure responsive to temperature changes and controlling the movement of said carriage, said program sheet having a metal foil strip adhesively secured thereto having a wave-line edge which represents the program, a heating circuit, and a relay controlling said circuit and in circuit with said stylus and said metal foil strip.

9. In a temperature control apparatus, a continuously driven drum, driven at a constant speed, driving means for said drum, a temperature control program sheet driven by said drum, a metal stylus resting on said program sheet, a reciprocating carriage supporting said stylus, apparatus responsive to temperature changes for causing reciprocating movements of said carriage and said stylus transversely of said program sheet, a contact section in said program sheet, said contact section having a wave-line edge which represents a temperature control program, a heating circuit, and a relay controlling said heating circuit, said relay being connected in circuit with said stylus and said contact section of said program sheet.

10. An automatic apparatus for producing a predetermined rate of change of a condition comprising, in combination, a galvanometer responsive to changes in the magnitude of said condition, a movable structure controlled by said galvanometer, a carriage moved thereby, a stylus on said carriage, a continuously driven drum, a program sheet of insulating material driven by said drum and engaged by said stylus, said program sheet being provided with conducting means outlined by portions of the insulating material in wave-line form which determines the application of the program to the apparatus for producing a change in the condition, and means in circuit with the stylus and last mentioned means for controlling said apparatus to produce the change according to the rate as determined by the program sheet.

PAUL P. CIOFFI.